United States Patent [19]
Adams

[11] Patent Number: 5,943,947
[45] Date of Patent: Aug. 31, 1999

[54] COOKING APPARATUS HAVING SPECIAL PORTS

[75] Inventor: Thomas D. Adams, San Diego, Calif.

[73] Assignee: 21st Century Cookware Inc., Spring Valley, Calif.

[21] Appl. No.: 09/003,674

[22] Filed: Jan. 7, 1998

Related U.S. Application Data

[63] Continuation-in-part of application No. 08/787,361, Jan. 22, 1997, Pat. No. 5,881,633.

[51] Int. Cl.⁶ .............................. A47J 37/00; A47J 43/00
[52] U.S. Cl. ................................ 99/341; 99/348; 99/422; 99/645; 366/130; 366/243
[58] Field of Search ............................. 99/348, 422–425, 99/645; 220/369, 370, 731, 661–663, 366.1, 676; 126/299 C, 381, 369, 390, 373; 366/129, 285, 130, 347, 279, 242–247

[56] References Cited

U.S. PATENT DOCUMENTS

| | | |
|---|---|---|
| 2,559,196 | 7/1951 | Medved .................................... 99/422 |
| 2,568,637 | 9/1951 | Jardim ....................................... 99/422 |
| 2,664,169 | 12/1953 | Misener et al. ....................... 99/645 X |
| 2,770,389 | 11/1956 | Drakoff .................................... 99/645 |
| 5,481,967 | 1/1996 | Chen .................................. 126/299 C |

*Primary Examiner*—Timothy F. Simone
*Attorney, Agent, or Firm*—Page Lohr

[57] ABSTRACT

A cooking apparatus includes a pan or skillet coupled with a lid of the invention which together form a special cooking chamber where a utensil may remain operable while it is in the cooking chamber and while the lid is in place on the skillet. In addition, a special port in the lid permits on to add spices, cooking oils and other ingredients to the cooking chamber without removing the lid. In this way, a lid of the invention allows one to prepare foods in a cooking chamber without having to remove the lid portion thereof. Preferred lids of the invention include: a dome shaped transparent element, having a slot and a port therein, a handle thereon and a port cover which is removable from the port by way of a hinge and a is driven by a finger lever.

6 Claims, 9 Drawing Sheets

COOKING APPARATUS HAVING SPECIAL PORTS

CONTINUING INFORMATION

This application continues as a continuation-in-part application from a previously filed application having a Ser. No. of 08/787,361 filed Jan. 22, 1997, now U.S. Pat. No. 5,881,633.

BACKGROUND OF THE INVENTION

1. Field

The following invention disclosure is generally concerned with cookware and is and specifically concerned with cookware having special ports including means for accommodating cooking utensils.

2. Prior Art

Inventor N. J. Medved teaches of a Time Saver Frying Pan Lid in U.S. Patent # 2,559,196 where the lid includes a complex arrangement of support for use of a cooking utensil while the lid remains in contact with the frying pan. Figure sheet 2 particularly shows the complex nature of the components of which the apparatus is made. These components having many intricate moving parts are exceptionally difficult to clean. The intended purpose of the device, saving time, is therefore frustrated by the nature of the device itself.

Notwithstanding, techniques have been discovered which provide very novel uses of cooking apparatus with improved features, particularly to cooking apparatus having special ports and support for cooking utensils and activity associated with cooking. In contrast to the good and useful inventions of the prior art, each having certain features that are no less than remarkable, the instant invention is concerned with a lid for a cooking device such as a pan where the lid includes a port for a cooking utensil and a second port for adding food stuff and ingredients into the cooking chamber at cooking time.

It will be understood that the above identified application for patent by the present applicant provides considerable definitions for elements used in descriptions of the present invention. Therefore, that patent application is entirely incorporated herein by reference whereby the instant specification can rely thereupon for enablement of the particular teachings set forth there.

SUMMARY OF THE INVENTION

Comes now, Thomas Adams with an invention of an apparatus for cooking including a specially configured lid having a plurality of ports therein.

A lid is arranged with a first port through which a cooking utensil may pass such that the handle portion is outside the cooking chamber and the head portion is inside the cooking chamber. Thus, the utensil remains fully operable while the lid is in place. The handle portion may be readily engaged by a hand while being connected by a rod to the head portion which might be used to manipulate food in the cooking chamber.

The lid is additionally provided with a second port. The second port operates to allow further access to the cooking chamber without disrupting the seal the lid makes with a pan onto which it sets. The port allows one to add matter to the cooking chamber during the cooking process. A lid which includes a convenient lid handle may be integrated with mechanical means which couples the handle to a port cover. The handle may be provided with mechanical elements which operate to lift a cover from the port. The cover being so lifted leaves the port open and operable for providing access to the cooking chamber. Cooking ingredients then can easily be introduced to the cooking chamber through the port. Replacing the cover over the port thereafter results in the cooking chamber being substantially sealed and protected from soiling the cooking environment outside the cooking chamber with splattered grease and other residue.

Although the ports are referred to discretely, they may be combined as a single element having two portions. Such arrangements are merely alternative versions of the same invention and will not constitute matter which is not fully anticipated.

Objectives of the Invention

It is an object of the invention to provide a versatile cooking apparatus.

It is a primary object of the invention to provide a cooking apparatus with special access ports configured integrally therein.

It is an object to provide a port which functions to allow a cooking utensil to pass therethrough and remain operable at the time of cooking.

It is an object to provide a port which operates to allow a user to add matter to the cooking chamber during the cooking process.

It is further an object to provide a cooking apparatus with a plurality of ports which enable cooking functionality without requiring a lid to be separated from a pan thus interrupting a seal of the cooking chamber.

A better understanding can be had with reference to the detailed description of Preferred Embodiments and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

PREFERRED EMBODIMENTS OF THE INVENTION

In accordance with each of the preferred embodiments of the invention, there is provided a cooking apparatus having special ports and support for food manipulation means and cooking functions. It will be appreciated that each of the embodiments described herein include an apparatus and that the apparatus of one preferred embodiment may be different than the apparatus of another embodiment.

Figure 1:
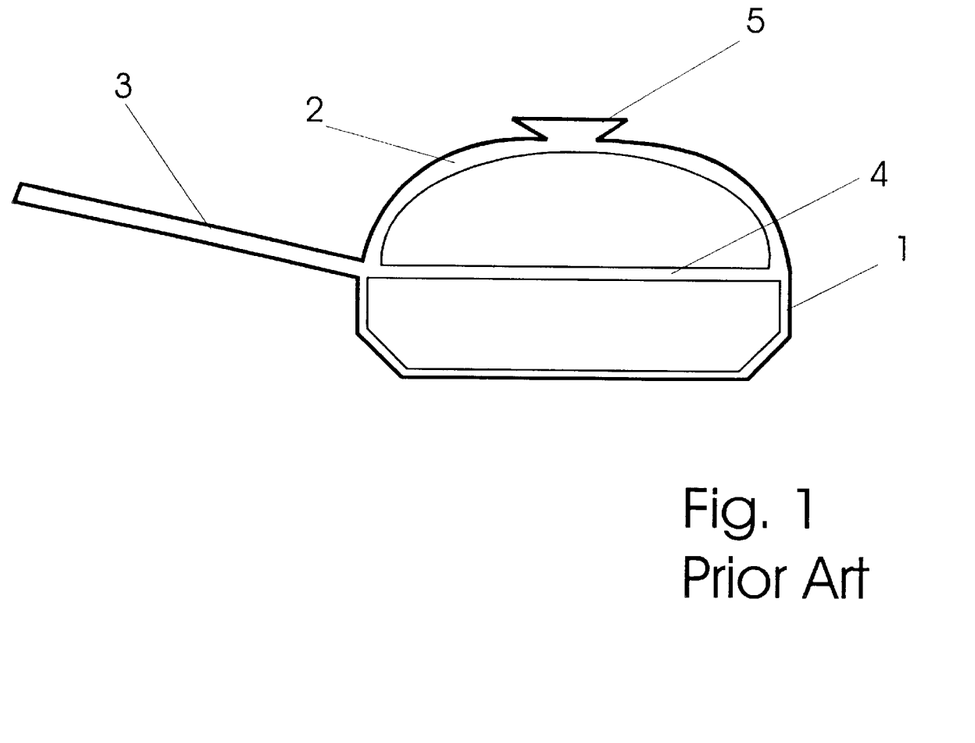
FIG. 1 shows a simple drawing example of cookware of the prior art.

With reference to drawing FIG. 1, one will recognize a familiar instrument, the common frying pan. Generally, a main body portion 1 is formed of a metallic material shaped to form a partial cavity. A lid 2 portion of the cooking chamber couples to the pan portion to form an enclosed cavity which is herein referred to as a cooking chamber. So that it may be moved about, a handle having 3 a low heat capacity may be affixed to the pan or the lid; either moving the other by way of the coupling between them.

Where the lid meets the pan, typically about a circular joint 4 (shown in the figure in cross-section), a seal is formed such that food cooking in the chamber does not upset the stove top with debris which may be propelled by hot gases and other opportunity. The lid, necessarily having to be removed from time to time, may include a handle 5 to advance and facilitate this function.

Figure 2:
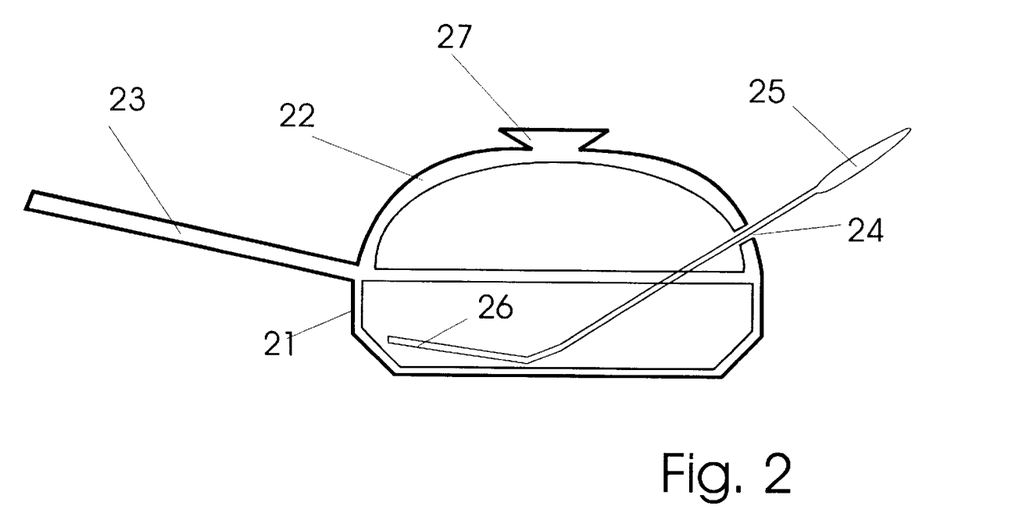
FIG. 2 illustrates a special arrangement where a cooking utensil may remain operable while partially enclosed in a cooking chamber.

Figure two illustrates a greatly improved arrangement of a cooking apparatus. Similarly having pan 21 and lid 22 portions and a handle 23, a cooking chamber may additionally include a port 24 through which a utensil may be passed. A hole may be formed into the lid which allows a utensil handle 25 to be passed therethrough while the head portion 26 remains in the cooking chamber. The lid having handle 27 placed onto the pan completes the enclosure and forms a seal as normal. Only a small portion of the cooking chamber remains uncovered by virtue of the hole in the lid. For purposes of clarity, this disclosure uses a specific term for such arrangement: the cooking chamber is said to be "substantially enclosed".

The arrangement of FIG. 2 is special as it allows new functionality for cooking apparatus. While the lid remains in place, one can manipulate the food in the cooking chamber. A hamburger may be turned, vegetables stirred, or other agitating processes which require a utensil can be carried out while the lid remains in place. It is important to allow the lid to remain in place on the pan where it makes a seal therewith because the lid prevents foods being cooked from making a mess about the cooking environment such as a stove top. In devices like those shown as FIG. 1, one must remove the lid before stirring the food inside.

The expert chef may recognize a shortcoming relating to devices like those shown in FIG. 2. While they perfectly allow one to manipulate the cooking food without removing the lid, they do not speak to other functions associated with cooking which may require one to remove the lid. Food preparation steps before cooking such as marinating processes may be affected without concern for removing a lid from a pan as they are done away from the heat and cooking chamber. However, some food preparation steps are taken during the cooking process. Basting a food while it is cooking sometimes includes applying a sauce, oils, spices, et cetera to the food. If one should wish to baste food being cooked in a device shown in FIG. 2, then one necessarily must remove the lid from the pan and therefore disrupt the seal and the integrity of the cooking chamber. Since it is a primary function of the present invention to allow one to cook foods without disturbing the substantially enclosed cooking chamber, whereby said 'allowing one to cookfoods' includes all functions associated with cooking for example turning and agitating of foods in addition to adding ingredients and other matter associated with cooking to the food while it is cooking, a second port is provided.

A port may be configured and arranged to cooperate with the lid in the following way. A lid being shaped like a dome has an axis of symmetry. A circular port may be formed into the apex of the domed lid such that it is concentric about the axis. So placed, the port is operable and well positioned to allow one to add matter to the cooking chamber with minimal chance for grease to splatter and pass through the port. Additionally, the port is nicely positioned so as to not disrupt the viewing function of the lid. As lids of the invention are preferably transparent thus allowing a cook to view the cooking foods, the port is placed in a location where it remains easy to have an unobstructed view into the cooking chamber despite the tendency of the port to block a clear view.

The port is additionally supported with a cover of complementary shape and size. The cover may remain in place while the port is not being used. The cover operates to block food particles from escaping the cooking chamber. As it remains an objective to provide a cooking apparatus which prevents mess by way of a substantially enclosed cooking chamber while simultaneously allowing one to perform cooking functions without compromising the seal a lid makes with a pan, the cover supports the effort by closing the port at times when one is not introducing matter to the cooking chamber.

Figure 3:
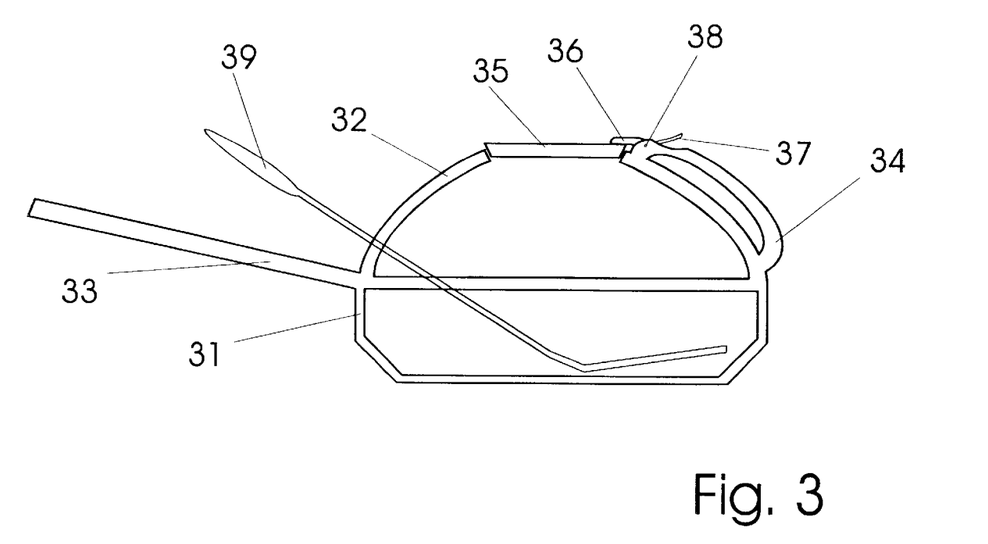
FIG. 3 is a cross sectional view drawing of a cooking apparatus with a special port, cover, and handle arrangement.

With reference to drawing FIG. 3 a particular preferred version of the invention is shown in a cross section drawing. A pan 31 is combined with a special dome shaped lid 32 and a handle 33. A second handle, a lid handle 34 may be affixed to the lid at two points each which lie on a line extending radially from the lid apex to the bottom edge of the lid. A cover element 35 is complementary in shape and fills a port having been formed about the apex of the dome. The cover may be coupled to a mechanism which operates to lift from and set to, the cover with respect to the port. That mechanism may be comprised of a member 36 attached fast to the cover, a lever 37 which may be operated by tactile forces, and a pivot axis 38. While holding the lid handle, one is able to lift the cover from the port by pressing with the thumb on the lever. In this way, one can easily get access to the cooking chamber while cooking food and without disturbing the seal between the lid and the pan. To stir or otherwise move the food being cooked, one is able to engage the handle 39 and use the utensil in a normal fashion. This all takes place while the cook has a clear and unobstructed view into the cooking chamber and the cooking chamber remains substantially enclosed.

Figure 4:
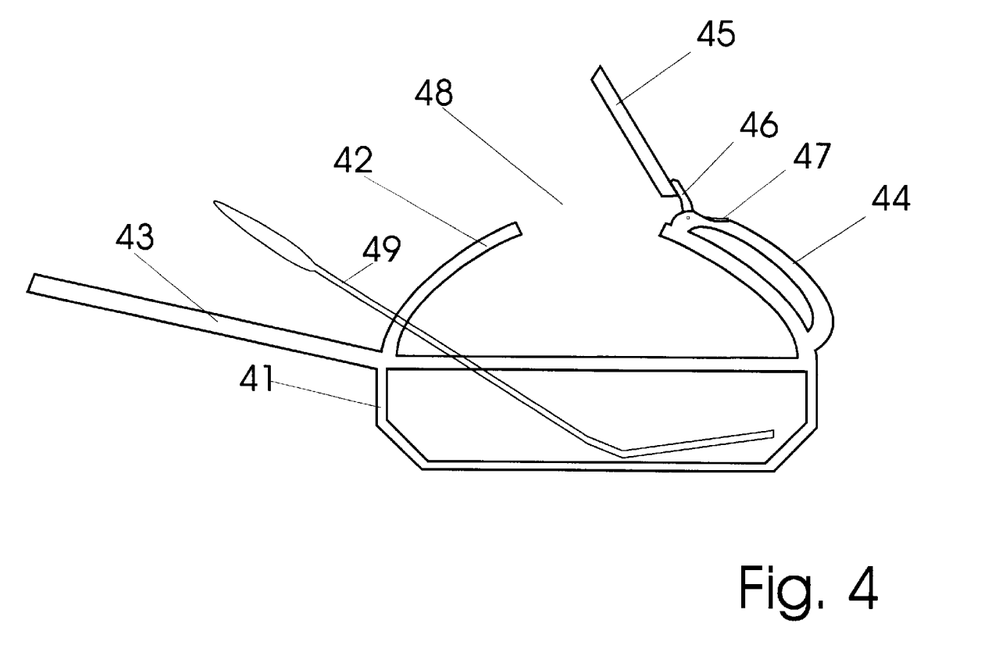
FIG. 4 shows a special port cover in an open position.

FIG. 4 illustrates a similar device having a cover in an open position. A pan 41, lid 42, pan handle 43, lid handle 44 are all members of the apparatus. The cover 45 being affixed to the mechanism 46, attached to lever 47 operate together to bring the cover to an open position under influence of forces which may be applied to the lever which is in a convenient position with respect to the lid handle. Careful review of the drawings shows the lever in a down position which causes the cover lift away from the port. The port hole 48 is located at the top of the lid and provides good access to the cooking chamber when the cover is in an open position. Operation of the port cover by way of the lever and lid handle does not interfere with operation of the cooking utensil 49. Together, the elements are arranged to cooperate and function as an ensemble. It is easy to appreciate that adding spices and so forth to food cooking in the pan would be quite easy in view of the port shown in the drawing.

Figure 5:
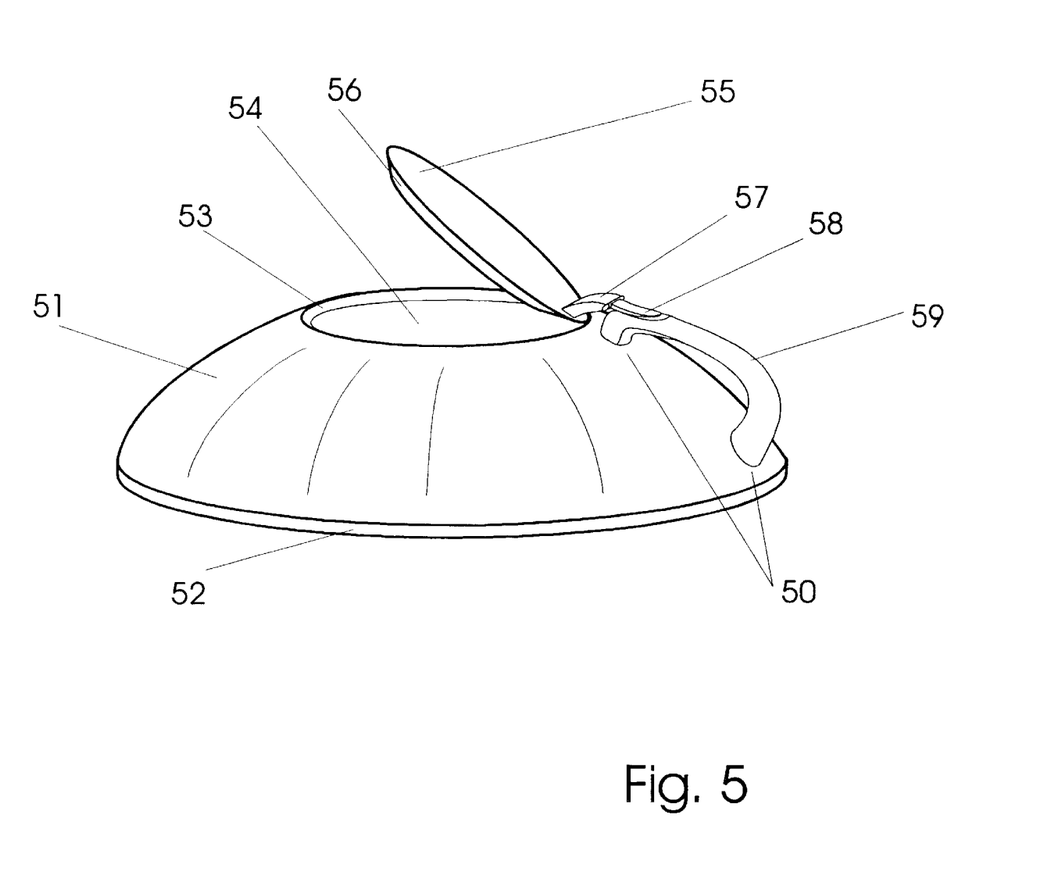
FIG. 5 illustrates in a perspective view, cookware of the invention.

A more thorough understanding may be had in consideration of the remainder of the drawings which set forth additional views and some alternative versions. Particularly, drawing FIG. 5 which shows a lid of the invention in a perspective view. The dome shaped surface 51 is preferably made from a transparent material such as glass. The bottom rim or periphery of the lid 52 forms a nice coupling with a skillet or pan onto which it may be set. A top rim of the lid 53 forms a circular opening 54, a port, through which cooking ingredients may be passed and added to the cooking chamber at cooking time. A cover 55 having a periphery 56 complementary in shape with respect to the top rim of the lid 53 forms a good enclosure when the cover is in a down position. Mechanical element 57 which may be affixed to the cover is coupled to finger lever 58 such that application of pressure to the lever causes the lid to be lifted away from the port hole. The mechanical means and lever may be coupled to a lid handle 59 which is affixed to the lid. Although the drawing shows a version where the handle is affixed at two places 50, it is fully anticipated that a version is possible where the handle is affixed at a single location nearer the port than the bottom edge.

Figure 6:
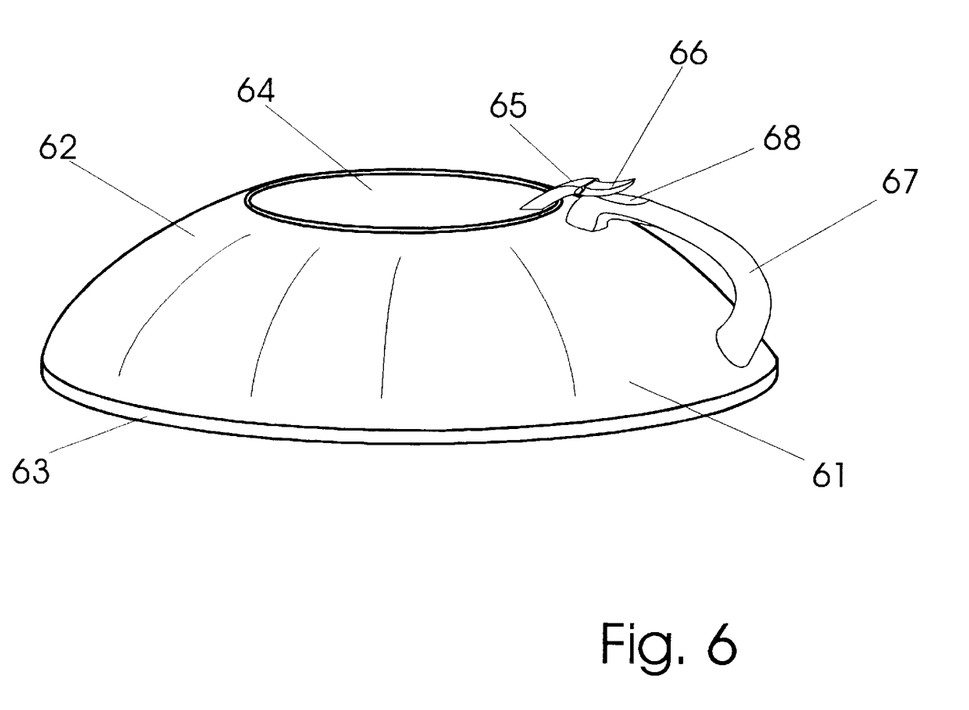
FIG. 6 similarly shows cookware of the invention, however the cover is shown, in a closed position.

FIG. 6 shows the same device where the cover is in a lowered position. The lid 61 having a curved outer surface 62 and a circular periphery 63, is joined by a cover 64 in a lowered position. Mechanical member 65 suitably attached to finger lever 66 is integrated with the handle 67. The handle may additionally have an indented portion 68 which operates to receive therein the finger lever when the finger lever is in a down position.

Figure 7:
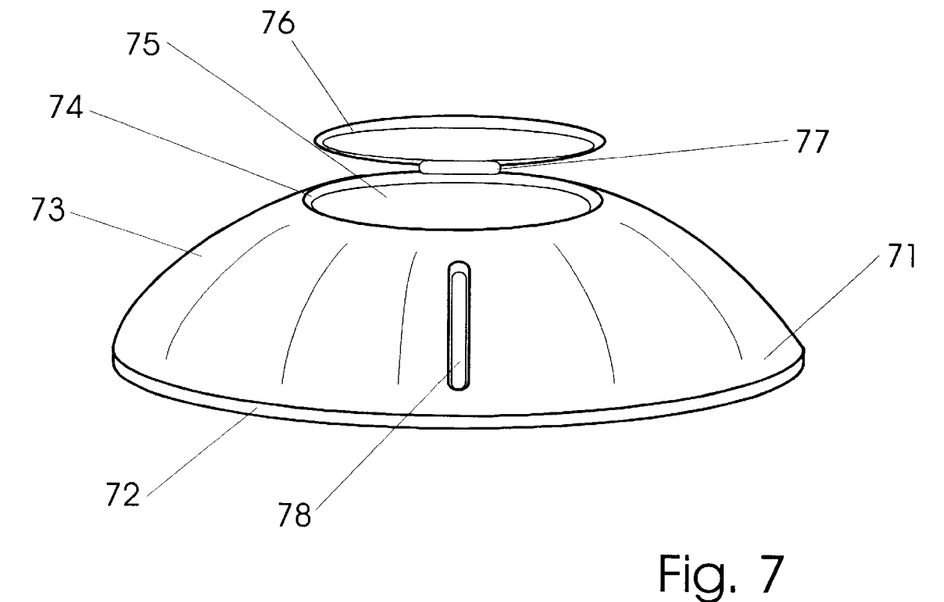
FIG. 7 is a perspective head-on drawing of a cookware cover of the invention.

FIG. 7 shows the lid 71 from a different perspective. Although the periphery 72, the dome shaped outer surface 73, the upper rim 74, and the port 75 appear the same, the perspective angle illustrated allows one to gain a more complete appreciation of the port cover 76 and pivot axis 77 which allows the cover to lift from the port. In addition, one can visualize a slot 78 into which a cooking utensil may be inserted and the spatial relationship of the slot with respect to the circular port.

Figure 8:
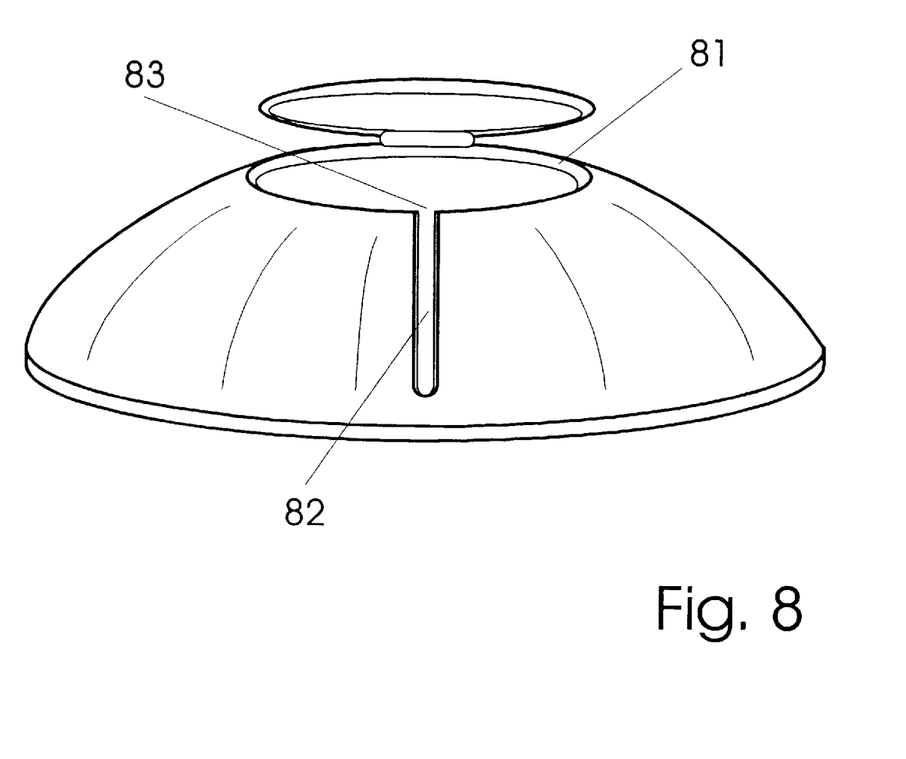
FIG. 8 shows a version where two parts are combined as a single opening.

As mentioned previously, the two ports may be integrated together as one. Although this presents itself as a mere alternative, it is a version of this same invention. Although language used throughout this teaching including the claims refers to "two ports", a single hole having two discrete portions and a shape which supports the two functions described constitutes two ports. That one combines them as one hole will not engender a new device outside the spirit and scope of this invention. FIG. 8 shows a configuration which combines two ports as a single hole. The circular portion 81 operates to allow one access to the cooking chamber for adding ingredients and the slotted hole 82 supports the function of making a utensil operable while the lid is in place on a frying pan or skillet. The two ports meet at a common opening 83.

Figure 9:
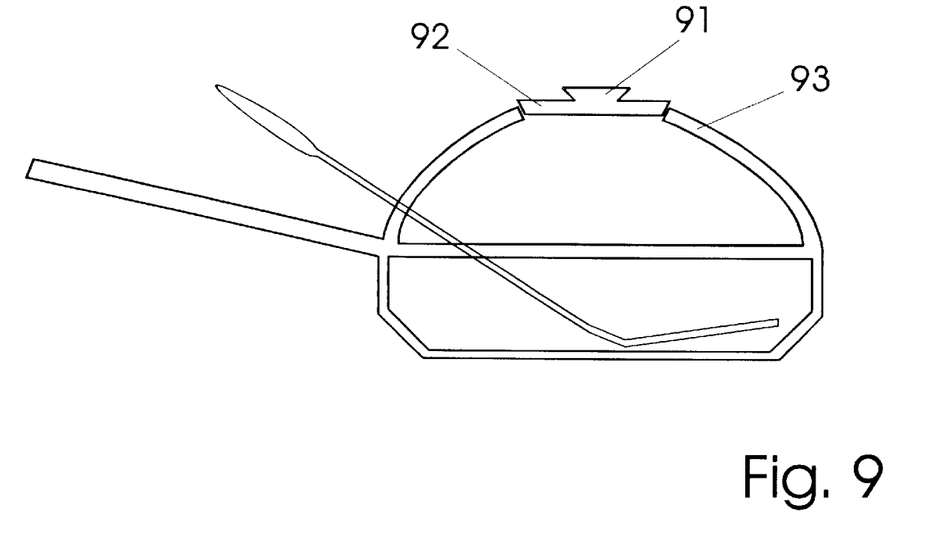
FIG. 9 shows a further alternative version in cross section.

FIG. 9 shows another alternative version. Where it is desirable to reduce complexity, one may eliminate the finger lever and mechanism which operates to lift the cover from the lid port hole. Instead, a simple knob style handle 91 can be added at the top and center of the cover 92. To add ingredients, one may simply lift the cover away from the lid 93 and have access to the cooking chamber.

One will now fully appreciate how the present invention will allow one to cook foods without disturbing the substantially enclosed cooking chamber, including all functions associated with cooking for example turning and agitating of foods in addition to adding ingredients and other matter associated with cooking to the food while it is cooking, a second port is provided.

Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

What is claimed is:

1. A lid portion of a cooking apparatus, the cooking apparatus forming a substantially enclosed cooking chamber which accommodates a utensil in a fashion such that the utensil remains operable, the lid portion being a dome shaped element formed of durable transparent material comprising: a periphery, an apex, a slot, a port, and a port cover, said slot being disposed in said lid between the periphery and the apex, said port being an opening in said lid, said cover being complementary in shape and size to the port and fitting therein, said port being arranged about the apex, further being generally circular in shape whereby the port provides access to said cooking chamber from the top thereof, said port having a boundary formed of an edge of said lid, said boundary forming a mechanical interlock whereby a fitted cover placed thereon is held by the edge and does not pass into the cooking chamber.

2. A lid of claim 1, further comprising: a handle; a finger lever; and a mechanical link, said handle being affixed to the convex side of the dome shaped lid;

said finger lever being arranged to cooperate with said handle such that the thumb of a hand which engages said handle is in a position to operate the finger lever;

said mechanical link connecting and coupling said finger lever to said cover whereby operation of the finger lever results in opening of the lid.

3. A lid of claim 2, said handle having two ends each mounted to said lid, the handle extending radially with one end near the port and the other end near the periphery of the lid, the handle being made of a material having a low heat capacity.

4. A lid of claim 3, said handle having an indent forming a partial cavity where the finger lever fits in the down position.

5. A lid of claim 3, said finger lever arranged on said handle at the end near the port, said finger lever operable for transmitting forces exerted on it to said cover by way of said mechanical link.

6. A lid of claim 1, said port and said slot being combined to form a single opening.

* * * * *